United States Patent

[11] 3,559,920

| [72] | Inventor | Alvin Edward Moore |
| | | 916 Beach Blvd, Waveland, Miss. 39576 |
| [21] | Appl. No. | 662,401 |
| [22] | Filed | Aug. 22, 1967 |
| [45] | Patented | Feb. 2, 1971 |

[54] CRASHPROOF LIGHT-WEIGHT VEHICLE
65 Claims, 20 Drawing Figs.

[52] U.S. Cl. .................................................. 244/5,
244/119
[51] Int. Cl. ................................................ B64b 1/20
[50] Field of Search ........................................... 244/119,
117, 120, 125, 128, 5; 114/66.5; 229/67; 217/72

[56] References Cited
UNITED STATES PATENTS

| 1,667,002 | 4/1928 | Hall | 244/119 |
| 1,972,005 | 8/1934 | Berbeck | 244/119 |
| 2,197,568 | 4/1940 | Donnell | 244/125 |
| 2,540,482 | 2/1951 | Hervey | 244/119X |
| 2,817,484 | 12/1957 | Stenzel | 244/119 |
| 2,977,077 | 3/1961 | Pearson | 244/137X |
| 3,009,672 | 11/1961 | Tharratt | 244/137 |
| 3,080,267 | 3/1963 | Schmalz | 9/6X |
| 1,857,347 | 5/1932 | Beebe | 114/66.5 |
| 1,996,534 | 4/1935 | Baker | 217/72 |
| 3,145,897 | 8/1964 | Kordowski | 229/67 |
| 3,184,187 | 5/1965 | Isaac | 244/43 |

*Primary Examiner*—Milton Buchler
*Assistant Examiner*—Steven W. Weinrieb

ABSTRACT: A lightweight, wreckproof, flying boat, airship, or other vehicle adapted to traverse water or land, comprising: a strong, barrel-curved cabin; and around it a shock-taking shield of foam plastic containing numerous lift-providing balloons. Preferably the vehicle is slightly heavier than air and also has other lift-providing means - for example fluidfoil means (a short wing and hydrofoil). It has means for landing on water, ice or other solid surface. The barrel-curved cabin wall may be made of solid wood or inflated stavelike elements, or laminated plywood, or wire mesh that is coated and impregnated with plastic. The vehicle, which also comprises a stern structure having shock-absorbing plastic and balloons, is generally shaped in airship fashion, or else as a large flying wing.

Alvin Edward Moore,
INVENTOR.

BY
Alvin E. Moore,
ATTORNEY.

Alvin E. Moore,
INVENTOR.

BY A. E. Moore,
ATTORNEY.

PATENTED FEB 2 1971

Alvin E. Moore,
INVENTOR.

BY A. E. Moore,
ATTORNEY.

CRASHPROOF LIGHT-WEIGHT VEHICLE

The design of a safe vehicle which will successfully withstand major shocks is an extremely important problem Large numbers of aircraft, boats, ships and land vehicles are being wrecked in storms and collisions with other vehicles or land projections with appalling loss of life and energy; and the wreckage problem probably will soon become acute also in the landing of space vehicles. In every field of transport, and especially in water and air travel, a craft with a strong and yet resilient hull or floats and a stabilizing, constant lifting force that is above its center of gravity is much needed.

The best way to supply such a constant lift appears to be the provision of an aerostatic buoyancy in the vehicle with balloon elements of lighter-than-air gas—for example helium, hydrogen, or hydrogen mixed with an inert gas The blimp, comprising a very large, weak, flexible envelope containing such gas, is easily torn and very slow and clumsy in flight. For a few decades the rigid dirigible provided hope for inventors. Although slower than the airplane, it was more spacious and quieter; and some of the Zeppelins had great success in very long voyages and length of vehicular life. For example, beginning in 1912, the Viktoria-Louise, floated by hydrogen, efficiently traveled more than two years in flight time, over some 70,000 miles, and carried nearly 3,000 passengers.

But the great dirigibles presented problems that were difficult to solve. They tended to break up in storms, and were hard to land and moor in rough weather; and in succession the United States lost the Navy airships Shenandoah, Akron and Macon. Probably the main reason so many dirigibles thus broke up under sudden great stresses was their rigid framework of necessarily very long, frangible, aluminum structural elements. Another important cause was the fact that their rigid framework was outside the gas bags, and thus had no outer shock-absorbing cushions. And a third reason was their great size and length, required by their reliance for lift only on the aerostatic force of lighter-than-air gas. Their resulting great length increased the danger from fatigue of the aluminum of their long structural elements and made safe control of them in rough-weather landings and moorings very difficult.

On the other hand, the present large airplane has the same fatigue-liable fault because it also comprises outer structural elements of aluminum and is too long and wide for their safety under great or repeated stress. Moreover, it has a further defect—not possessed by the lighter-than-air craft—of crash landing under great descending speed. Its flying height, weight and the distance thru which it sometimes falls are so great that, together, they cause a deadly momentum at the time of impact.

In view of the above facts, an object of this invention is to provide a very strong, lightweight vehicle that successfully can withstand major or long-repeated shocks. Another purpose is to design a flying boat or other aircraft that in a crisis of engine failure may be landed on water or ground without appreciable damage. Another objective is a very strong but lightweight cabin, comprising one or more barrellike elements. A further purpose is to provide a vehicle having such a cabin in combination with a stabilizing, aerostatic lifting force that is centered above the vehicles's center of gravity. Another object is to supply a vehicle that has such a cabin, an outer cushion against shocks, and short, very strong but lightweight lift-providing wings. And a further objective is a lightweight, strong structural member comprising permanently inflated, thin-walled, flexible balloon elements that are imbedded in closed-cell plastic foam, which bars escape of the lighter-than-air gas of the balloons.

The foregoing and other objects of the invention will become more fully apparent from the following detailed description of the inventive structure and from the accompanying drawings, in which.

Barrellike Cabin Structure

Figures 1, 2, 3, 4, 5, 6:
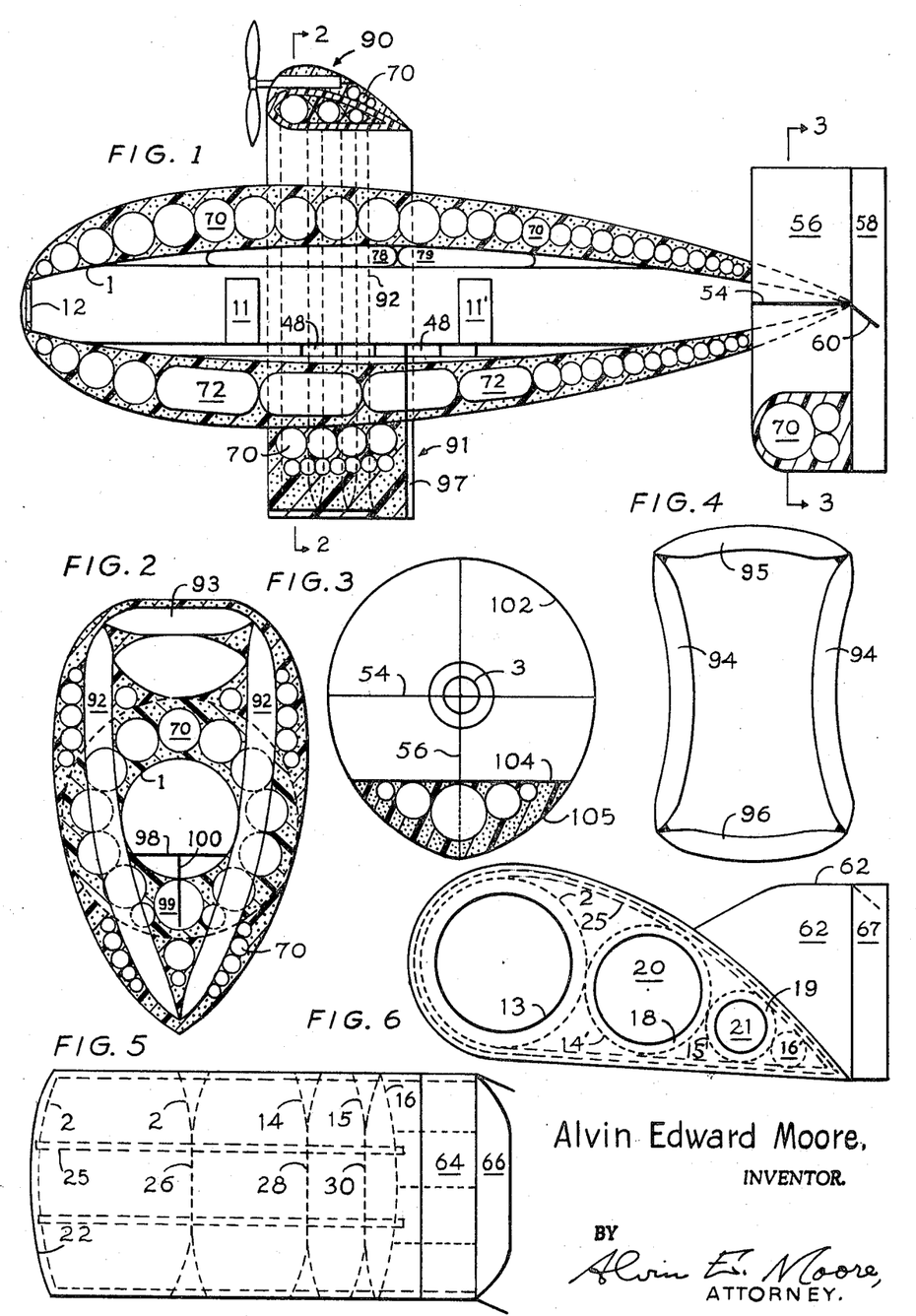
FIG. 1 is an elevational view, in section from a vertical plane thru the vehicle's longitudinal axis, of one form of the invention.
FIG. 2 is a sectional view along the vertical plane indicated by the line 2-2 of FIG. 1 (with the motor and its top wing fairing not in place) of one of the optional types of floats or ground-engaging landing means.
FIG 3 is a sectional view of the stern of the craft of FIG. 1, from the plane 3-3 of FIG. 1.
FIG. 4 is a detail, elevational view of a set of wing and float braces that optionally may be used instead of those shown in FIG. 2.
FIG. 5 is a plan view of a second form of the invented vehicle.
FIG. 6 is a side elevational view of the craft of FIG. 5, showing a type of junction between its barrellike elements that is different from that of FIG. 5.

Each of the illustrated forms of the invention comprises a cabin, the main part of which is somewhat similar in construction to a barrel; but in some important respects the main cabin structure is different from the common barrel. In FIGS. 1 this barrel-curved cabin wall is indicated by the numeral 1, in FIGS. 5 and 6 by 2, in FIGS. 7 and 8 by 3, in FIGS. 10 to 14 by 4, and in FIG. 16 by 5. Per unit of weight, it provides great strength against outside shocks from any direction because of the fact that its outer surface is convexly curved both longitudinally and transversely of its axis; and preferably its inner surface is concavely curved, longitudinally and transversely, with respect to its inner, load-carrying space, thus presenting against outside shocks a second set of arches—convex curves in every direction.

This barrellike cabin or fuselage (or at least its main part) optionally may be constructed in any of several ways, each of which provides a very strong structure. A preferred method is to build it of staves or stavelike panels of one of the following materials: solid wood; plywood; strong, molded, dense plastic (reinforced by flexible, preferably resilient fabric such as spring-steel or phosphor-bronze mesh); thin steel (preferably spring steel), each panel being shaped while in annealed condition and then tempered; aluminum or magnesium alloy, titanium or titanium alloy; glass or lightweight concrete, reinforced by wire mesh.

If made of wood, the cabins shown in FIGS. 5, 10, 11 and 16 (each of which contains an opposite pair of doors 143, somewhat similar to barrel heads, but containing doorways) may comprise panels in the form of staves that are made by known cooperage methods. But when the cabins of FIGS. 1 and 7 have stavelike wooden panels these are not squared at each end like barrel staves, but are blunt at one end and pointed at the other.

Wood has the advantage of great strength and endurance per unit of weight. Many tests of the U.S. Forest Service have shown that this natural, fibrous material is less sensitive to repeated stresses than are more crystalline materials, such as metals. Wood is far less subject to disrupting fatigue under long-repeated shocks than for instance were the aluminum alloys of airplanes that have broken apart, at least partly because of fatigue, in recent years. The specific wood of the curved cabin wall depends on engineering and economic factors; but currently any of the following woods is deemed to be very efficient in cabin construction: spruce; redwood; cedar; cypress; yellow poplar; basswood; hickory; ash; balsa (a hard, very light wood); eucalyptus, elm and quipo. Hickory is a heavy wood, but is so tough and resilient that stavelike panels of it may be made considerably thinner than those of the soft woods, and yet compare favorably with them in moduli of rigidity and elasticity.

Figure 13:
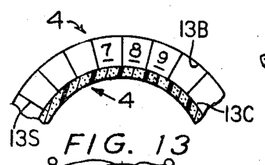
FIG. 13 is a detail, sectional view from a plane normal to the axis of a barrel-curved cabin and across a cabin portion of larger diameter, illustrating another, optional type of cabin wall.
Figures 14, 15:
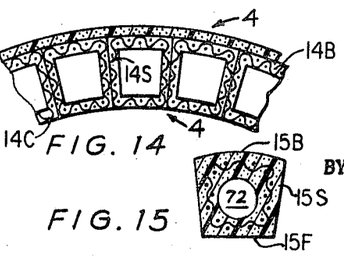
FIGS. 14 and 15 are detail sectional views of other optional types of barrel-wall construction, illustrating two forms of hollow stavelike elements.

Other optional, hollow forms of stavelike panels are illustrated in FIGS. 13 to 15. In FIG. 13 three of the assembled hollow, stavelike panels are indicated by the numerals 7, 8 and 9.

Each has curved outer and inner walls and two planar sidewalls that have radially inner and outer curved edges. The four walls are integrally (or weldedly) joined together in hermetically sealed junctions and have hermetically sealed junctions at their ends, and thus form airtight hollow spaces. These spaces are filled with gas (preferably helium, hydrogen, hydrogen mixed with ten to fifteen percent of inert gas, ammonia or nitrogen) at a pressure above that of the atmosphere. When the walls of thin metal or plastic reinforced with strong metal mesh this pressure is preferably between twenty and sixty pounds per square inch.

Figure 7:
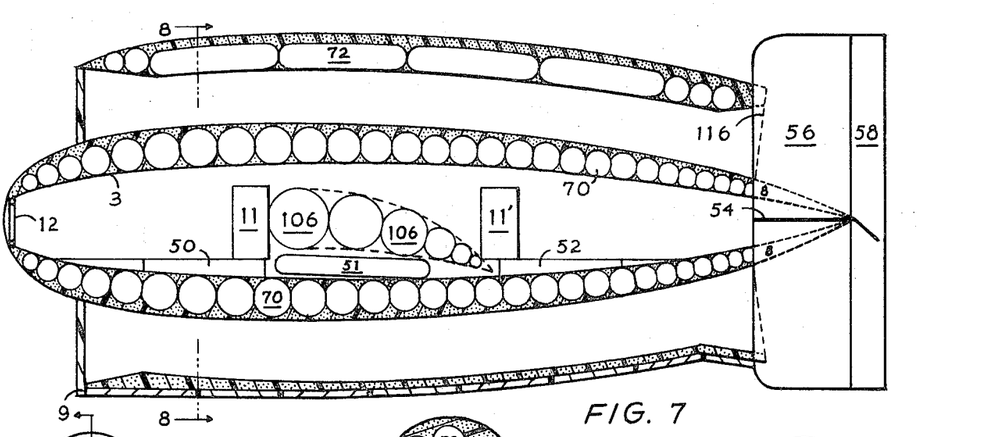
FIG. 7 is an elevational view, in section from a vertical plane thru the vehicle's longitudinal axis, of a third form of the invention.

The chosen type of sealed junctions or junction elements at the ends of a stavelike panel depends on the form of the vehicle that is being built. In the forms of FIGS. 1 and 7, in which the cabin has a bluntly curved plexiglas window (and/or door) containing, forward end and a tail portion in the form of a curved quasi cone, the stavelike panel (optionally of unhollowed wood or of hollow construction) has a plan-view shape similar to that of FIG. 17, comprising a forward spherical or toroidal blunt end, 7B, and an after pointed end, 7C. When the panel is of the hollow type its four walls have a forward sealed junction comprising a spherically or toroidally curved plate or cap and a weld, soldering, or cement, and a rearward sealed junction comprising soldering, welding or glue. When the wall material is of thin, tempered, spring steel the junctions preferably comprise soft solder; but alternatively epoxy-resin cement may be used.

If the hollow panels are of plywood they may be formed by hot or cold pressing of glue-coated plies between a mold and core. If of thin resilient steel or phosphor bronze they may be made by the hot or cold pressing of thin, annealed-metal sheets of steel or bronze into two channels, each comprising part of the planar sidewalls, and thereafter, hard-soldering or welding the channels together and to the end junctions; or one channel, comprising the whole sidewalls may be pressed and then hard-soldered or welded to a cover plate that has been curved by such hot or cold pressing and to the end junctions. After being formed in one of these two ways the completed panels may be tempered by moving them thru cold liquid and thereafter gradually heating them until their metal has the desired degree of resilience. If of steel or bronze they also may be made by casting and (preferably) subsequent hot or cold working. If of plastic, glass, or lightweight concrete (comprising for example aggregate of expanded shale or clay) they may be formed (cast) in molds.

The inflatable hollow panels of FIG. 13 also may be made, as indicated in FIG. 14, of plastic or glass, reinforced by wire mesh. This may be done by forming the wire mesh (preferably of spring steel or phosphor bronze) into an elongated channel, having planar side portions, curved inner and outer portions, in some cases an end portion (and in others an end point), placing this around a core in a mold, and pouring the plastic material. Then the core can be withdrawn and an end closure member, having a closable inflation tube, may be bonded to an end of the open channel. Another, similar construction of such hollow materials of wire-reinforced plastic (resin or glass) is indicated in FIG. 15. Here the hollow space is round in cross section; and, if desired, there may be placed in it an inflatable core, 72 of rubber or very thin, soft metal.

Each of the above-described stavelike panels, embodied in a strong vehicle, has curved surfaces and planar side surfaces or edges that are somewhat similar to those of a barrel stave. Although in one form of the craft, for example, that of FIGS. 1 and 7, these panels may be pointed at one end (instead of blunt), each in general has an exterior barrel-curved surface (13B, 14B, 15B). As shown in FIGS. 13 and 14, the panel preferably also has an interior barrel-curved surface (13C, 14C; it has arcs of smaller diameters than those of the exterior surface. Each of the panels of FIGS. 13 and 14 thus has elongated exterior and interior barrel-curved surfaces; each is arcuate both in the direction of its major, elongated axis and perpendicularly to that axis, is in the general shape of staves, and has straight planar sides (13S, 14S) that converge at an axis of the vehicular cabin (which is the center of curvature line of the exterior and interior surfaces of both the panels and the cabin).

Figure 13A:
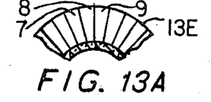
FIG. 13A is a similar detail, sectional view, indicating the decreasing radii of curvature of the stavelike panels and cabin of FIG. 13 from the cross section of that FIG. toward an end of the cabin.

From its barrellike bulge of largest diameter the cabin curvingly slopes, with decreasing radii of curvature of these surfaces, to at least one of its ends; and preferably, as illustrated, this bulge is in a middle part of the cabin, and its barrel-curved surfaces slope, with decreasing radii of curvature to both ends of the cabin. This lessening of radii is illustrated in FIGS. 13 and 13A. FIG. 13 is a sectional detail view across the axis of the cabin at one of its larger-diameter portions, and FIG. 13A is a similar view from a plane spaced from this larger portion, toward one end of the load-carrying space. The radii of the arcs 13B (and the radii of the circumference 13E of the skin means around 13B) progressively decrease from the cabin's largest diameter to at least one of its ends; and in a similar manner the smaller radii of the interior arcs 13C decrease toward the same end (or ends) of the cabin.

In FIG. 15 an alternative and optional type of the stavelike panels is shown. Here the internal surface, 15F, has a straight line in each cross section normal to the elongated axis of the panel, but, as in FIG. 13, 13A and 14, the interior surface is arched for extra strength in a plane containing its elongated axis; but it is not curved in cross-sectional planes that are perpendicular to its axis. Its planar sides 15S are like the planar sides 13S and 14S in that they interiorly slant toward each other, and their planes converge at the center line of the curvatures 15B and of the cabin, thus adding to the vehicle the strength of wedging tendencies of these preferably glue-bonded planar sides when the panels are subjected to external force.

Figures 16, 17:
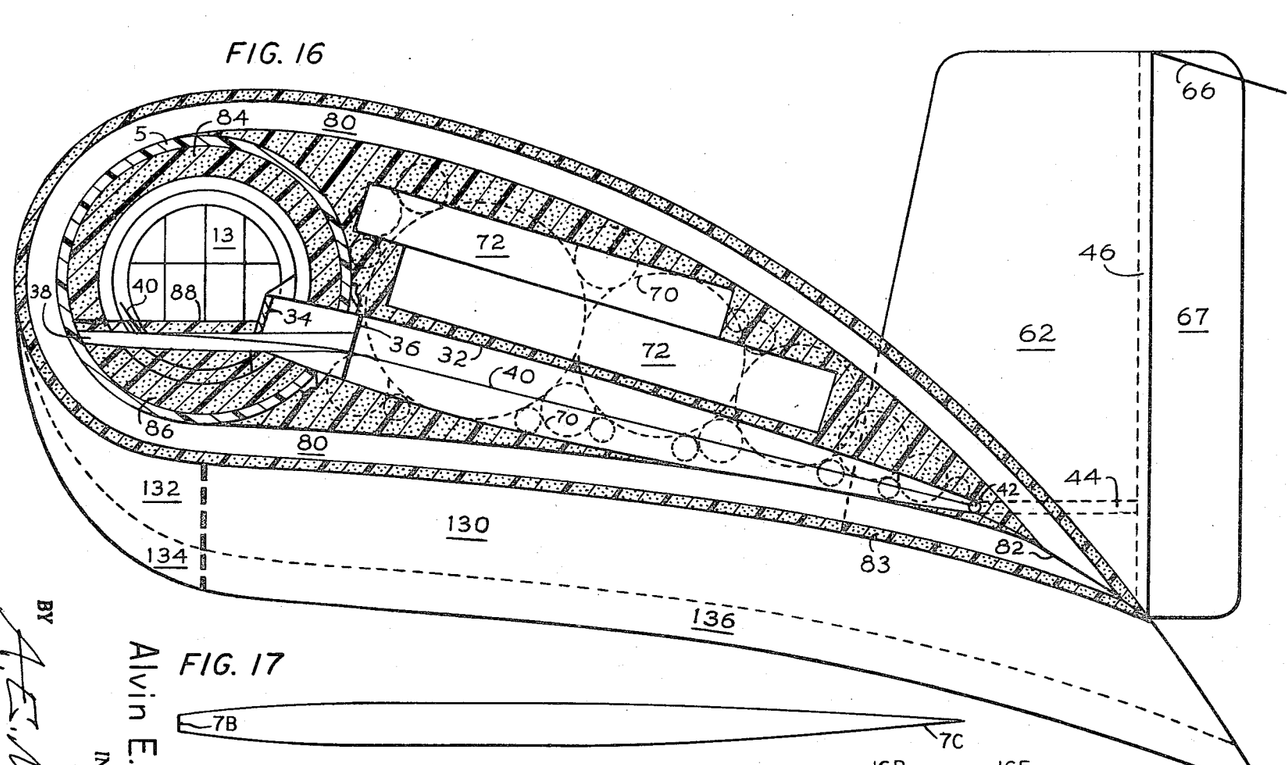
FIG. 16 is an elevational view, in section from a vertical plane through the vehicle's longitudinal axis of a fifth form of the invention.
FIG. 17 is a plan view of one of the stavelike panels utilized in the general type of cabin shown in FIGS. 1 and 7.
Figure 18:
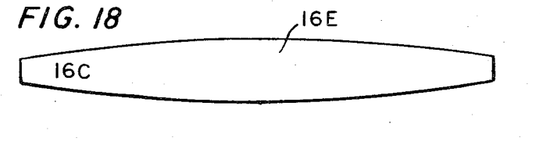
FIG. 18 is a plan view of the blunt-ended, barrel-curved panel utilized in the type of cabin shown in FIGS. 5, 6, 10, 11 and 16.
Figure 19:
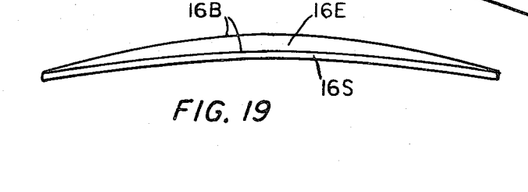
FIG. 19 is a side view of the panel of FIG. 18.

The barrel curving of the stavelike panels is also indicated in FIGS. 17 to 19. FIG. 17 shows the type of panel that is embodied in the fore-and-aft cabin of FIG. 1 or FIG. 7; and the panel of FIGS. 18 and 19 is the general type used in the construction of the cabin part of the vehicle of FIG. 5 or of FIG. 11. FIG. 19 shows the barrel curving of a panel from one of its ends to the other. One of its wedging planar sides is indicated at 16S; its barrel-curved exterior surface extends between the curved lines 16B in FIG. 19, and is shown at 16C in FIG. 18; and the portion of the panel (and cabin) having the greatest radius of curvature is indicated at 16E.

In assembly of the staves or stavelike panels in the cabin wall their planar sidewalls, which are to be in contact, are coated with glue (preferably epoxy-resin cement); and they are preferably jammed into and clamped in such contact by forcing strong, looped means (glue-coated metal bands or hoops) up their outer curves. These hoops, 9a, preferably are of thin spring steel and are shaped to the approximate curvature of the wall. Then, optionally and preferably, other looped means comprising a wire mesh (of aluminum alloy, or fine steel wire which may be of spring steel) is stretched tautly over and bonded to the curved wall.

Optionally the barrellike cabin may be made without use of narrow, stavelike elements. It may be of relatively wide curved staves or panels or gores of thin iron, steel or spring steel—by die-forming them with shallow flanges at their edges, bonding the flanges together with solder, welding or epoxy-resin cement, and stretching and bonding a strength-providing looped means (mesh of the above type) over the whole. But because of its necessary thickness of solid metal—its weight for given strength—this method is not preferred.

Another, better way of making the cabin wall without narrow stavelike members is to form it of laminated plywood. One method of doing this comprises the following steps: (1) machine-pressing and cutting veneers into curved stavelike panels or gores of the proper curves and sizes; (2) assembling one set of the gores (exteriorly coated with a slow-setting glue) and with their side edges in contact taping them together around a barrel-shaped inflatable bag (of slightly stretchable fabric impregnated with rubber), moderately inflated—to the yielding point of the elastic fabric; (3) assembling another set of gores of glued, slightly different-sized veneers over and around the first set; (4) assembling a third set of the glued gores over and around the second set that are slightly wider than and staggered relative to those of the second set; (5) clamping a hinged, two-part metal mold tightly over the gores; (6) strongly inflating the bag to a pressure sufficient to stretch its elastic fabric; (7) allowing the glue to set; (8) deflating and withdrawing the bag from the interior of the formed member; (9) unhinging the mold; and (10) removal of the barrellike structure. Preferably the number of assemblies of gored strips exceeds the three mentioned above.

Another method of making this main part of the cabin wall of plywood is similar to that described above except that each of the successive assemblies of veneer comprises a long, narrow strip of glue-coated veneer that is spirally wound, by hand or machinery, around the moderately inflated bag with the straight, parallel side edges of the strips in juxtaposition (and optionally either slightly overlapped or an edge-wise contact). The wound strip of each successive assembly is narrower than that of the assembly on which it is wrapped, so that the juxtaposed, glue-joined strips are staggered, for strength.

When the barrellike structure is formed of plywood in any of the four above-described methods optionally the following other step may be added between steps (4) and (5): assembling gores or spirally-wound narrow strips of metallic or fibrous cloth, impregnated with slow-setting glue, over the composite ply of step (4), This additional step adds strength to the completed cabin.

Two other methods of making the main part of the cabin without the use of narrow stavelike elements are the same as that outlined above except that, instead of the material of the stavelike gores or spirally-wound strips being plies of veneer, they are of nonelastic, bendable fabric (for example fiberglass cloth, or mesh of steel, aluminum alloy or copper), impregnated with flexible plastic.

And two other optional methods are somewhat similar to the above-described four, but the successively assembled gores or spirally-wrapped narrow strips are of wire or fabric mesh of the above type; the inflatable-bag core is coated with talc or with plastic of the type to which foamed plastic will not adhere; and plastic-foam materials are inserted between the hinged mold and the bag, so that the foamed plastic surrounds overlapped, reinforcing wires or strands. This plastic optionally may be either of the rigid type or slightly flexible.

Figures 11, 12:
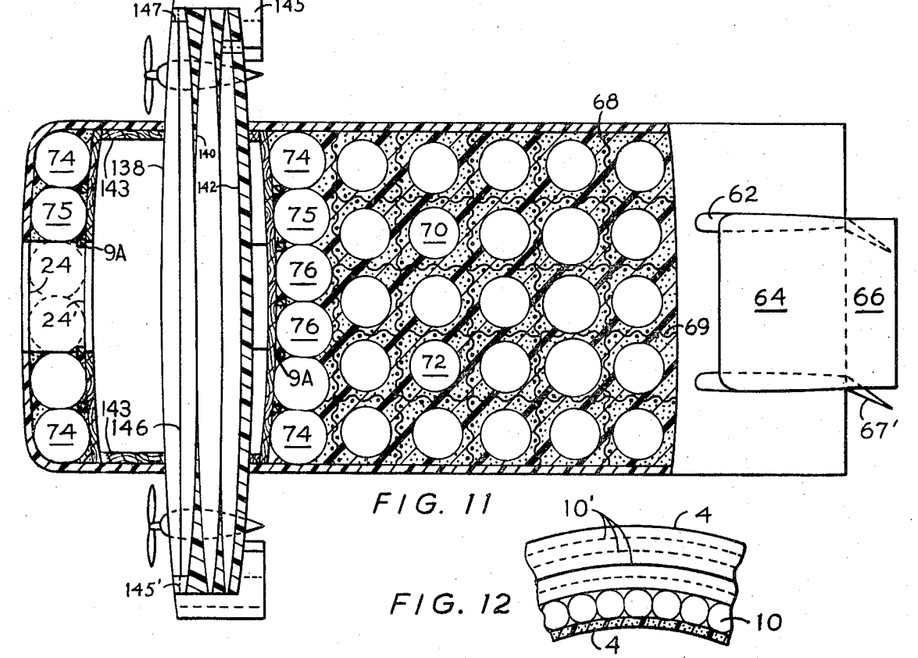
FIG. 11 is a sectional view of the propeller-and-wing portion of the vehicle from the plane 11-11 of FIG. 10, and of a middle portion of the craft from the plane 11A-11A of FIG. 10.
FIG. 12 is a detail, sectional view illustrating an optional type of structure of the wall of the barrellike cabin of any of the forms of the invention.

Another way of making the barrellike structure is indicated in FIG. 12, a detail view in section from a plane thru a blunt end of such a structure. At this plane the curved, inflated, hollow tubes 10, which extend along the major length of the structure, are closely nested and bonded together; but as they approach the middle bulge of the barrellike structure they are spaced apart, because of their curve. Around them, and soldered or cemented to them, there are numerous annular tubular rings 10'. Glued or otherwise bonded over and to these rings, there is a skin that preferably comprises wire mesh of spring steel or other metal, impregnated and coated with flexible plastic. A lining of fabric-and-plastic is glued to the inner surfaces of tubes 10; and the space between the lining and the outer tubes and skin is filled with foam plastic. The tubes may be of any of the materials of inflated tubular elements that are described elsewhere in this specification. Preferably they are permanently inflated with lighter-than-air gas at a pressure well above that of the atmosphere—for example, at 20 to 70 pounds per square inch.

Each of the barrellike cabin structures comprises door and window means. Each of the vehicles of FIGS. 1 and 7 has two opposite pairs of windowed doors, 11 and 11', each of which comprises a strong metal outer frame and framed plexiglass hinged within it; and element 12 optionally may be a door, but preferably comprises two plexiglass windows, of which only the inner one is hinged, for cleaning. In the forward cabin of each of FIGS. 5 and 6 there is a pair of opposite, windowed doors 13; and there are similar windowed doors in the cabins of FIGS. 10, 11 and 16.

STERN OR TAIL STRUCTURE

All of the illustrated forms of the invention have after structures that comprise stern bracing means and shock-absorbing, cushioning means. In each of these forms except that of FIGS. 1 to 4 the after bracing means includes at least one barrellike vehicle-strengthening member that is similar to the above-described cabin structure, preferably comprising mesh around the assembled panels, as described above.

In FIGS. 5 and 6 three such elements in tandem arrangement, abaft the cabin, are indicated: in FIG. 5 at 14, 15 and 16, and in FIG. 6 at 14', 15' and 16'. These structures may be made by any of the methods described above in connection with the manufacture of the barrellike cabins. Members 14' and 15', as well as 14 and 15, have planar (or optionally outwardly dished) vehicle-sidewalls 18 and 19 that are like the sidewalls of the barrellike cabins of FIGS. 10 and 16. Each of these sidewalls is somewhat similar to the head or bottom of a barrel, but it is interrupted by an annulus or doughnut-shaped ring of metal (for example, steel or aluminum alloy). This ring due to its arched nature adds strength to the cabin-strengthening sidewall; and it contains and is hinged to the frame of a door, shown in FIG. 6 at 20, 21. These doors, optionally comprising hinged, framed plexiglas, provide view for any passengers that are inside the compartments. Each door may comprise double panes. Also in the forward bulge 22, as well as in the similar bulge of the vehicle of FIG. 16 there is a double plexiglas window (or pair of such windows) of the type shown at 24 and 24' in FIG. 11, with the rear, framed, plexiglas 24', preferably being hinged, for cleaning of the inside surfaces of these windows. The hinges, when thus preferably used, form connecting means between these windowed elements and other, adjacent, parts of the cabin structure. If this craft is large and designed to transport numerous passengers doors 20 and 21 comprise windows of plexiglas; but if it is to carry much bulky freight door 21 preferably is without windows, and door 20 may be either windowed or of solid material.

The tandemly-arranged sets of compartments in FIGS. 5 and 6 are tautly held in clamped-together relationship by curved tie means, which preferably comprises two or more well-spaced, oblong, thin-spring-steel bands or hoops, 25 that are forced over and cemented and-or otherwise fastened to outer surfaces of the barrellike members. Also at their points of contact the compartment walls are cemented and bolted or riveted together; and around all of the thus assembled compartments a cushioning or shock-absorbing means is formed, comprising the above-mentioned plastic and balloons which will be further described below.

FIG. 5 shows an optional method of assembly of the tandemly-arranged compartments when their walls preferably are slightly flexible. These may be, for example, of any of the previously described flexible types of stavelike members, or the flexible type of structure shown in FIG. 12, or strong fabric or mesh coated and impregnated with slightly flexible plastic. In this form of FIG. 5 the currently preferred type of this barrellike construction comprises: curved layers or plies of strong mesh of thick textile fabric, spring-steel wire or small-diameter rods, one mesh in close juxtaposition with the other, with their interconnected filaments, wires or rods overlapping each other; and flexible plastic coating and impregnating the layers of mesh.

In assembling these compartments of FIG. 5 they are clamped toward each other until their junctions at 26, 28 and 30 are somewhat flattened against each other and glued in that position.

In FIGS. 5 and 6 the after compartment 16 or 16' is a sealed hollow structure, preferably pointed at each end and permanently inflated with lighter-than-air gas at a pressure well above that of the atmosphere. Preferably its wall comprises cemented and slightly-flanged, plastic-impregnated wire mesh or other fabric, or stavelike gores of very thin spring steel, having shallow side flanges that are soldered or cemented together.

In FIG. 16 an auxiliary, strength-providing barrellike structure or tubular beam is shown at 32. Optionally, it may be made by any of the above described methods of constructing such compartments. Its head or cap 34 and an apertured bar 36, fastened inside the barrel-curved beam, support tube 38. Inside this tube there are guides (which may be pulleys) over which lines or cables, one of which is shown at 40, may be reciprocated. These cables go thru tube 32, and at transverse pipe 42 (fixed to 32) they are divided and go thru pipe 42 and laterally-spaced conduits 44 and 46 to controls for the elevator and rudders that are laterally spaced apart in the manner of FIG. 5. The barrel-curved beam 32 thus serves two purposes: to strengthen the tail part of the large flying wing; and to guide control cables. And preferably it also has a third purpose: the housing and guiding of weights of the type shown at 48 in FIG. 1, which may be reciprocated by an hydraulic or electric motor for longitudinally trimming the craft, and optionally, when it is an aircraft, space vehicle or submarine, for its elevation or descent. These weights may be slidable or wheeled boxes containing luggage or other parts of the useful load—but preferably they are the electric batteries of the craft and their reciprocation is feasible because of flexible electric conductors, of the type which may be repeatedly bent without damage, that connect the batteries with fixed electrical equipment.

Another type of structure for achieving longitudinal trim and-or elevation is indicated in the fuel or other liquid-storage tanks 50, 51 and 52 of FIG. 7. Liquid is drawn from 51 for normal consumption in travel, and tanks 50 and 52 contain reserve fuel or other liquid for use in a possible emergency. In trimming, the nose of the vehicle may be elevated by pumping liquid from tank 50 to 52, or lowered by pumping liquid from 52 to 50. Optionally, transverse trimming may be achieved by such movable liquid or solid weights located in the below-described laterally-spaced floats or wings.

Figure 10:
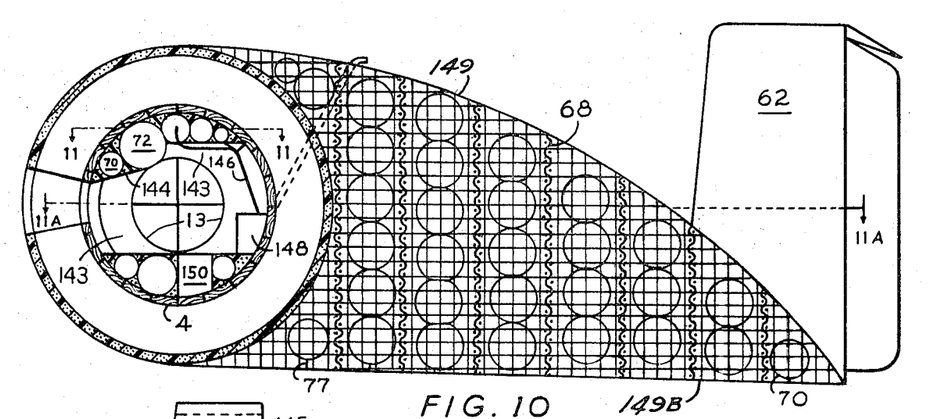
FIG. 10 is an elevational view, in section from a vertical plane thru the vehicle's longitudinal axis (with the foam plastic around the after balloons not shown) of a fourth form of the invention, shown as, optionally, without wingtip floats.

The disclosed stern structures comprise stabilizers, elevators and rudders which may be made of thin spring-steel, or (as in fins 62 of FIG. 11) of juxtaposed inflated tubes (which preferably are of thin metal, permanently inflated with lighter-than-air gas), controlled by known control means. In FIGS 1 and 3 the pointed, sternmost part of the barrellike cabin is slitted to form two perpendicular recesses, and in these horizontal stabilizer 54 and tail fin 56 are cemented or soldered. By tabs or a metal hoop and bolts they also are fastened to outer surfaces of the cabin. Rudder 58 is hinged to fin 56, and elevator 60 to stabilizer 54. FIGS. 5 and 6 show a pair of spaced tail fins 62 that are securely fastened to the barrel-curved cabin structure's sidewalls 18 and 19 and the upright parts of the vehicle's skin or shell. These fins are bridged over by horizontal stabilizer 64, to which is hinged an elevator 66. Spaced rudders 67 are hinged to fins 62. The stabilizers, rudders and elevators of FIG. 16 are like those of FIG. 5, and the rudder and stabilizers of FIG. 7 are like those of FIG. 1. In FIGS. 10 and 11 the stern controls are somewhat similar to those of FIG. 5, but are set inward from the lateral sides of the vehicle.

The tail structure of FIGS. 10 and 11 comprises perpendicularly-arranged upright members of mesh 68 and 69, preferably of spring steel, that are fastened together with solder, or twisted short wires, and-or glue. They form vertically extending or upright channels in which balloons are nested. As shown in FIG. 10 at 70, these are spherical; but preferably a round-ended cylindrical balloon of the type shown at 72 in FIG. 7 is placed within each of the upright wire cages. Around the whole of this assembly, and around a plurality of laterally juxtaposed, doughnut-shaped, inflated rings, 74, 75 and 76, a long sheet of preferably spring steel wire mesh, coated and impregnated with flexible plastic is bent and fastened, above and below the balloons. Vehicle sidewalls of the same skin material are joined to the top and bottom skins. The balloons are kept from rising against the top skin by bits of foam rubber cemented to their tops, or by cord or wire ties 78. The doughnut-shaped rings are endless tubes, resembling automobile tires, of fabric plies, coated and impregnated with rubber or other plastic and preferably are inflatable from within the cabin with air or lighter-than-air gas thru tubes and valves. When filled with the lighter-than-air gas these rings thus are balloon means. Optionally instead, they may be of very thin spring steel or very ductile metal, permanently inflated with lighter-than-air gas and sheathed with rubber. Rings 76 are interrupted in their forward parts, and their upper and lower disc-closed ends are bonded to the frame of double window 24–24'.

AEROSTATIC AND SHOCK-TAKING MEANS

Balloons 70 and 72 form the main portion of aerostatic means which exert a lift and stabilizing effect on the vehicle that is centered above its center of gravity. Some of these are within the wings and the floats or other landing means; and preferably, as indicated in FIG. 1 at 78 and 79, other balloons are within the top part of the load-carrying space in the vehicle of each of the invention forms. All of them are imbedded in (surrounded by) vehicle-cushioning or shock-taking means, comprising sealed-cell plastic foam. These balloons, permanently inflated with helium, hydrogen or other lighter-than-air gas, may be made of plasticized balloon-cloth but preferably are of thin, elastic rubber. The closed cells of the substantial thickness of the gas-containing plastic prevent loss of the lighter-than-air gas from the vehicle. If any of this gas permeates thru the thin rubber (or balloon-cloth) of the balloon walls it is stopped in the surrounding layer of the lightweight, insulating plastic. In some locations - for example in the floats under certain conditions—it may be desirable to have the gas in the balloons under pressure well above that of the atmosphere; this may be done by using plasticized balloon cloth for their material. In any event, the balloons are under pressure that is at least slightly above that of the atmosphere because they necessarily are under such pressure due to their inflation. And this small pressure is increased during the process of making the foamed plastic. The liquid materials of this plastic are poured in situ within the closed and sealed spaces between the barrel-curved structures and the mesh-reinforced skin; and as the gas in the foam is formed it expands against these and also against the balloons, thus compressing the gas they contain. The amount of their resulting gaseous pressure may be increased by increasing the amount of the liquid foam-plastic materials, or lowered by decreasing this amount. In most locations the balloons are under pressure of a few pounds per square inch; and this pressure is a further insurance against their permanently-inflated gas from becoming weak enough during the life of the vehicle to cause their strength-providing arches to become weak.

By known methods this foamed plastic (for example, polyurethane foam) may be made in rigid form or of varying degrees of flexibility. In the shield against shock of this invention it is preferably sufficiently rigid to withstand minor shocks without deformation but is moderately flexible and resilient, so that it yields without cracking under major shocks (as in an emergency landing on ground from high flight), and returns substantially to its former shape after shocks are over. Each of the vehicles shown in the drawings is adapted for such safe emergency landings on water, ice or ground because of its strong, barrel-curved structures—and further because of the shock-absorbing or cushioning means around them.

In the invention forms shown in FIGS. 6, 10 and 11 a further part of the buoyant shield against shock preferably comprises the above-described type of inflated rings 74, 75 and 76. And in the form of FIG. 16 numerous juxtaposed tubes 80, of varying sizes to fit the tapering, curved outer surface of cabin wall 5, have the same general function. Instead of being doughnut-shaped, these are semicircular around the bow of the vehicle and are streamlined in their after parts to conform with the general shape of the flying wing. Each of the two after ends of each tube is sealingly closed by a vulcanized or soldered disc; and these discs are vulcanized, cemented or otherwise bonded together into a unitary junction 82. These strengthening members 80 may be made of the same materials as rings 74—76, are interrupted for two windows on each side of the cabin's forward bulge in the manner of rings 76, and are inflated with preferably lighter-than-air gas at a pressure well above that of the atmosphere. Around them and within the outer, V-shaped spaces of their junctions there is a flexible, foamed-plastic cushion 83, sheathed by a skin comprising flexible plastic that is reinforced with textile or wire fabric. This skin and cushion smoothly streamline the outer surface of the flying wing. Optionally, tubes and skin and cushioning plastic of this type also may be used for the outer portion of the vehicle of FIG. 6.

Within the flexible, foamed-plastic, partly-cylindrical cushion 84 that is in the upper part of the load-containing space of cabin wall 5 there are numerous balloons of the type of 70 and/or 72 shown in the after portion of the vehicle; these, as well as similar balloons in the more rigid foamed plastic 86, below deck or floor 88, are not illustrated in FIG. 16 as the cross section plane does not intersect them. This lower part of the cabin-contained foam plastic preferably is rigid or nearly rigid and its materials preferably are poured separately from those of 84.

FLUIDFOIL AND EARTH-SURFACE ENGAGING MEANS

Each of the above-described vehicles of FIGS. 1 to 4 and 7 to 9 may be used on land or as a surface-water craft without the disclosed lifting fluidfoils. Or, when aircraft, each may be designed to be large enough, with sufficient volume of lighter-than-air gas, to serve as an airship. But preferably, as indicated in the drawings, they and the vehicles of FIGS. 6, 10 and 16 are a little heavier than air, and may comprise wings which are short, but because of the craft's light weight of sufficient spread - when it is an aircraft or space vehicle - to take off or land with a short run or slide, and when it is a boat, land or monorail vehicle to rise some relative to its stationary position, thus reducing the friction that impedes its travel.

In the form of FIGS. 1 to 4 the upper wing 90 is combined with the float and-or other landing device 91. They are mutually supported and securely fastened to the barrel-curved cabin wall 1 by inflated, strength-providing members 92 and 93 (or 94, 95 and 96). Bonded and strapped to wall 1, these may be elongated tubular elements, repeatedly inflatable from inside the cabin, of several plies of textile or metal fabric, coated and impregnated with rubber. But preferably they are of thin spring steel or else very ductile metal generally round in cross section, but flattened and soldered or welded at their ends, as indicated at the bottom of FIG. 1 and in FIG. 4. These may be originally made of straight, entirely flattened tubes of annealed steel or aluminum or copper, which are soldered or welded at their ends. Then they are permanently inflated with lighter-than-air gas under pressure well above that of the atmosphere (for example 15 to 70 pounds per square inch), which rounds out the middle part of their shape; and their gas-inlet tubes are flattened and soldered or welded. They are then bent to the desired shape (for example that of FIG. 2 or FIG. 4); and if their material is steel or phosphor bronze it preferably is quenched and tempered into spring metal. Before the plastic of the buoyant shock-taking shield is formed around the cabin wall 1, a set of these tubes, including the horizontal tube 93 (or straight tubes 95 and 96), is fastened to 1; and at their joined, flattened ends they are glued or soldered, and may be bolted or riveted together when their flattened ends are long enough to prevent puncture by perforating them. As shown in FIG. 1, the tubes are of successively smaller diameter from fore to aft, and the skin over their upper portions is faired into the cabin wall 1. Over the lower portions of the tubes in the float of FIG. 2 this skin is more sharply faired toward the stern, and terminates in a nearly-knife edge just aft of strengthening metal pipe 97, which goes thru the cabin wall and ties in with the deck 98. Element 99 in FIG. 2 is an optional tank that may be placed below the deck, from which liquid may be withdrawn via pipe 100.

In FIG. 4 the lower tubes 96 (decreasing aft in area of cross section) are juxtaposed and bonded together in upper and lower aerodynamic skins, and within foamed plastic, forming the major strength-providing elements of a lower fluidfoil which provides extra lift in water of the air. This type of surface-engaging device thus serves as both a float and a hydrofoil when it is in the water. It may be used to encompass the cabin of any of the disclosed forms of this invention.

Between the cabin wall and the upper set of wing-bracing tubes (93 or 95) there is an open space, thru which the propeller's slipstream passes - without compressing interference between the substantially horizontal lower surface of the wing and the skin and cushion around the cabin. This open space is formed by thin sheet material (spring steel or ordinary steel or aluminum alloy) which prevents the poured plastic foam from entering the space.

FIG. 1 also shows an earth-surface-engaging device or float at the stern of the vehicle. This comprises: a curved element (102, FIG. 3) of thin spring-steel sheet material (or alternatively of juxtaposed inflated tubes within a streamlined skin) that is soldered or otherwise bonded to the radially outer edges of 54 and 56; a horizontal sheetlike element 104 that is fixed to bottom horizontal edges of 102 and 56; a flexible skin, 105, of the above-described type, bonded to 102 and extending below 104 in a streamlined lower portion; and, between the lower surface of 104 and the streamlined part of the flexible skin, slightly flexible plastic foam, surrounding balloons 70.

The vehicles of FIGS. 6 and 10, like those of the other forms, may be operated without the use of separate floats or the like; but optionally either may be provided with surface-engaging means of one of the types shown in the other vehicle forms.

Figure 8:
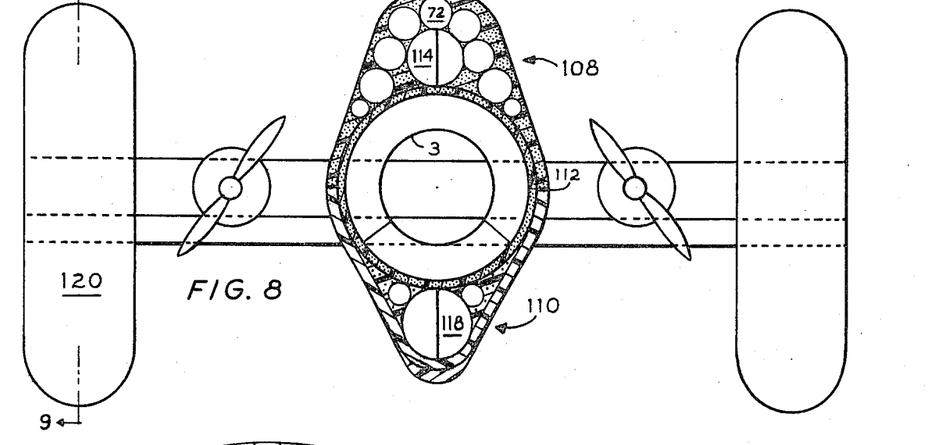
FIG. 8 is a sectional view of the vehicle from the plane 8-8 of FIG. 7, with optional floats added to the wing tips, and with the fin and stabilizer not shown.
Figure 9:
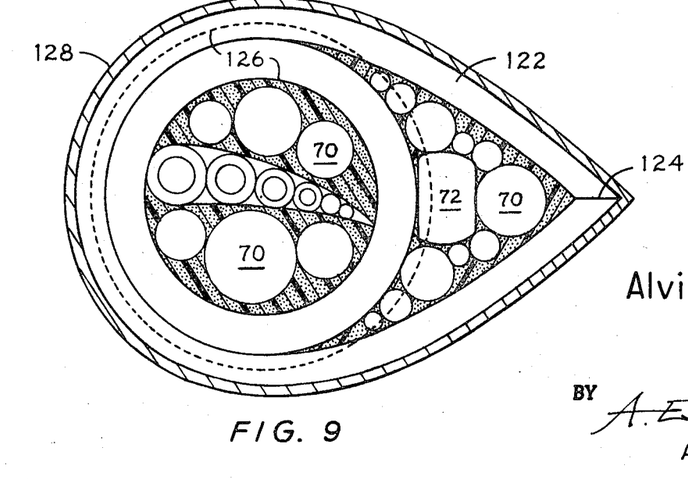
FIG. 9 is a sectional view of a combined float and balloon element taken from the vertical plane 9-9 of FIG. 8.

In FIGS. 7 to 9, the numeral 106 indicates strong, lightweight, strongly-inflated wing spars that are tubular, made of one of the above-mentioned materials of tubes 92 to 96, and inflated with lighter-than-air gas. They extend thru the cabin and thru strong metal frames in holes in the barrellike cabin wall. Successively from fore to aft they are of smaller diameter, and are arranged to conform to the aerodynamically streamlined skin of the above-described type which covers them. Plastic foam fills the space between them and the skin.

In this form of the invention combined balloon and earth-surface-engaging means are shown. One of these combined units is shown around the cabin in FIG. 8. It comprises an upper lighter-than-air member 108 and a lower flat or the like, 110, which may be lighter than air, the two parts being bonded together along planes 112, and surrounded by a unitary skin of the above-described type. Lift-providing element 108 comprises balloons, including one large balloon 114 that is made in the general fashion of the elongated, flat-ended tubular elements 92-96. Preferably it is of metal foil (of copper, iron, spring-steel or aluminum alloy) and is permanently inflated with lighter-than-air gas. Its flattened after end is sufficiently long to allow its being sealed by epoxy-resin cement or solder and yet have unbonded sternmost parts 116. In assembly, these two parts are forked and glued or otherwise bonded over and to the forward edge of fin 56. Member 118 is similar to 114, but preferably is of much stronger material and therefore is not lighter than air. Optionally member 118 may be a storage tank, which for example holds liquid. It is flanked by balloons, imbedded in flexible plastic foam.

Optionally, combined balloons and floats 120 on the wing tips also may be utilized. These comprise: an outer skin of the above-described type; an outer inflated tube 122 of the general type of tubes 80, with its ends separately disc-closed and bonded at 124; an inner pair of inflated rings 126 that are like tubes 74 and 75; balloons of various sizes; and flexible foam plastic that surrounds the balloons. Preferably these wingtip devices also include (as an armor and a skid for landing on ice, the ground, an aircraft carrier or rails) a narrow band 128 of spring steel (or alternatively brake-lining type of material) - or optionally such a band of short pieces of one of these two materials, flexibly glued together or otherwise hinged. Such an armoring and solid-surface-engaging means preferably is used also with the floats of the vehicles of FIGS. 1, 5, 11 and 16. Or, optionally, wheels and wheel supports of any known type may be added to this landing means of the invention form of FIGS. 7 to 9, and to that of any of the other disclosed forms of the vehicle.

FIG. 16 shows wingtip floats which, like the bottom of the wing, present an acute angle of attack to the fluid (water or air) moving below it. This float comprises separately formed, sealed and inflated tubes 130, 132, 134 and 136; glue (or solder) bonding the disced ends of these tubes together; a skin of the above-described type; and plastic foam within the skin and around the tubes.

FIGS. 10 and 11 illustrate a very strong wing—comprising supporting and bracing wing elements, 138, 140 and 142. These elements are hollow spars of the above-described barrel-curved type of construction, which optionally may also be used instead of the cylindrical-tube wing spars of FIGS. 7 and 8. These barrellike wing spars 138, 140 and 142, juxtaposed and within wing-forming plastic foam that is sheathed with an aerodynamically streamlined skin of the above type, extending thru the cabin and out of holes in its end closures 143, may be made by any of the above-described construction methods of barrel-curved structures. As indicated in FIG. 10, these tubular spars are located above the round, windowed doors 13, and extend thru the cabin-end closure elements 143. As shown in FIG. 11, these end elements preferably are of wood. The tubular spars are preferably inflated with lighter-than-air gas, and if of wood they preferably contain linings of material less permeable than wood (for example rubber bags) which are inflated with the gas. Element 144 is a sheet of fabric or other very flexible material, which with the foam plastic and the flexible balloons it surrounds, forms a safety device for the passengers. Ailerons 145, pivotal on axles 145', may be controlled by motors 147, which receive fluid or electricity from the cabin.

In this form of the invented vehicle shown in FIG. 10 there are three types of means for exerting lift on its barrel-curved, practically crashproof cabin. One of these three comprises balloon means. The other two are fluidfoils, namely: the above-described wing means that laterally juts from and is supported by the cabin, and the outer, streamlined, flying-wing shape of its main skin means, which exerts a lift due to the sternward and downward slope of its upper surface, 149, and the small, positive angle of incidence of its bottom surface, 149B, shown in FIG. 10 as sloping downward, with respect to a horizontal plane, from the vehicle's bow or nose to its stern.

PROPELLING MEANS

Jet or rocket motors optionally may be used to propel the vehicle of any of the forms. But when the vehicle is a low-flying aircraft, hovercraft, boat or land vehicle the illustrated type of motor and propellers are preferred. The motive means shown in FIG. 1 or FIG. 10 may be of the internal combustion or the electric type, but preferably it is hydraulic, receiving driving fluid via the barrellike wing spars from the lower part of the cabin. In FIG. 10, for instance, pipe 146 conveys hydraulic fluid from the power plant comprising the engine-and-pump assembly 148. The heavy weight of this unit is thus placed on the deck in the after part of the cabin to aid in maintaining the center of lift on the vehicle above its center of gravity. Another, optional aid in this purpose is the chamber 150, in which heavy items to be transported - such as tools, freight and luggage - are stored.

In the claims the expression "barrel-curved" means: outwardly curved both in planes thru the longitudinal axis of the structure referred to and in planes perpendicular to that axis; the word "plastic" signifies any type of synthetic or natural plastic; the word "gas" means: any pure gas or gaseous mixture; the word "mesh": any kind of apertured fabric, comprising woven or otherwise joined fibers, cords, metallic wires, filaments or lightweight chains; "tube" or "tubular elements": a hollow article, elongated and having ends, or curved and endless, circular or noncircular in cross section, and open or sealed; the term "looped means" refers to a disclosed type of curved assembly bands, for example, the oblong bands 25 of FIG. 5 or FIG. 6 or the barrel-hooplike rings 9A of FIG. 10, and/or equivalent looped means assemblingly placed over barrel-curved structures (such as the disclosed steel mesh); and the word "boat" signifies a vehicle that traverses water and-or flies in the air.

I claim:
1. A transportation vehicle, comprising:
   flexible, vehicle-strength-providing skin means, having a substantially streamlined shape;
   within said skin means, at least one vehicle-strength-providing, barrel-curved frame member having a hollow, load-carrying space and a straight axis, comprising a plurality of elongated, stavelike panels curvingly assembled around and defining said hollow space, each of said panels having: an elongated, barrel-curved exterior surface, arcuate in the direction of said axis and also arcuate in planes normal to said axis, with its middle arcuate, elongated line lying substantially in a plane that contains the axis; a pair of straight, planar sides which substantially lie in planes that contain and converge at said axis; and an elongated interior surface that is curved, in an arch, from one end of the panel to its other end;
   vehicle-strength-providing looped means, between said skin means and frame member and encompassing the frame member, strongly holding said sides together in said member;
   shock-taking means, comprising plastic, between said frame member and skin means, in contact with said looped means and aiding said skin means in holding its streamlined shape;
   at least one door in said frame member, adapted to permit the passage of a person into and out of said hollow space;
   means for exerting a lift on said load-carrying frame member;

means, connected to said frame member, for propelling said vehicle; and means, connected to said frame member, for steering the vehicle.

2. A vehicle as set forth in claim 1, in which said looped means comprises metal hoops and means fastening said hoops to and tautly around said stavelike panels.

3. A vehicle as set forth in claim 2, in which said hoops are of spring steel.

4. A vehicle as set forth in claim 1, in which said looped means comprises metal mesh, encompassing said frame member, imbedded in said plastic.

5. A vehicle as set forth in claim 4, in which said mesh comprises spring-steel wire.

6. A vehicle as set forth in claim 1, in which said stavelike panels comprise wood.

7. A vehicle as set forth in claim 1, in which: each of said stavelike panels comprises a die-formed, thin-metal channel having a barrel-curved inner surface and side flanges constituting the said planar sides.

8. A vehicle as set forth in claim 1, in which each of said panels comprises: wire reinforcing mesh having an elongated, curved inner portion and planar side portions, constituting the said straight sides; and material comprising plastic impregnating and coating said wire mesh.

9. A vehicle as set forth in claim 1, in which each of said panels is hollow and comprises: wire reinforcing mesh having elongated, curved inner and outer portions, planar side portions, joining the said inner and outer portions and constituting the said planar sides, and end portions; material comprising plastic, impregnating and coating said wire mesh and sealing the hollow space between said portions; and gas in said hollow space.

10. A vehicle as set forth in claim 9, in which said gas is under a pressure above that of the atmosphere.

11. A vehicle as set forth in claim 9, in which said gas is lighter than air.

12. A vehicle as set forth in claim 10, in which said gas is lighter than air.

13. A vehicle as set forth in claim 1, in which said hollow space is adapted to contain a useful load and said straight axis is in a fore-and-aft direction, and in which said vehicle further comprises a windowed member across said axis, in the forward part of the vehicle.

14. A vehicle as set forth in claim 13, in which some of said stavelike panels are shorter than others and in which said vehicle further comprises at least one windowed member fixed to and between adjacent ends of the said shorter panels.

15. A vehicle as set forth in claim 13, comprising a windowed member, in which said assembled panels have blunt forward ends and pointed after ends, said forward ends being strongly joined around said windowed member, and the said pointed after ends being joined in a pointed portion of said frame member that conforms to a streamlined stern of said vehicle.

16. A vehicle as set forth in claim 1, in which said assembled panels form the barrel-curved frame of a load-carrying cabin that has opposite openings in its walls, and in which said vehicle has a windowed member, closing each of said openings.

17. A vehicle as set forth in claim 1, in which said vehicle comprises, at each end of said cabin, a curved-periphery, cabin-strengthening sidewall fixed to ends of said stavelike panels, and in which said door comprises a curved frame of strong material that is within and attached to one of the said sidewalls.

18. A vehicle as set forth in claim 1, comprising a plurality of barrellike, barrel-curved, strength-providing frame members each of which has a said hollow space, in which at least one of said frame members form a load-containing cabin, having at least one end that comprises: an endlessly-curved, cabin-strengthening wall having an opening in it; and in which said door is a windowed member in said opening; and means strongly attaching said windowed member to said cabin-strengthening wall.

19. A vehicle as set forth in claim 18, in which each of at least two of said barrel-curved frame members has parallel straight, longitudinal axes that are transverse to the vehicle's fore-and-aft direction; said last-named barrel-curved frame members are tandemly arranged; and said vehicle comprises connecting means firmly attaching said barrel-curved frame members together, comprising oblong, curved tie means of strong material, encompassing said frame members and holding them in clamped-together arrangement.

20. A vehicle as set forth in claim 19, in which: said stavelike panels comprise stiffly resilient material; said connecting means clamps said frame members toward each other, forming flattened junction-parts of the frame members that resiliently bear against each other; and said connecting means comprises bonding material, strongly joining said junction-parts.

21. A vehicle as set forth in claim 18, in which at least one of said barrel-curved frame members has a said cabin-strengthening wall at each of its ends, and an opening and a windowed member in each of said walls.

22. A vehicle as set forth in claim 21, said lift-exerting means comprising strength-providing barrel-curved members which are partly located inside said load-containing cabin and have portions that project thru said openings, and a lift-producing element around each of said portions.

23. A vehicle as set forth in claim 22, in which said lift-producing means exerts an aerodynamic lift on said load-containing member and said lift-exerting elements are aerodynamically shaped skins.

24. A vehicle as set forth in claim 1, further comprising: vehicle-attitude-controlling means attached to its after part; and means for actuating said attitude-controlling means, connected to said cabin.

25. A vehicle as set forth in claim 1, in which said barrel-curved frame member comprises the major part of a forward cabin that is adapted to house a useful load, including at least one person, and in which said vehicle has an after portion which comprises: within part of said skin means, upright members of strong-material mesh; balloons of thin material, containing gas, between portions of said upright members; and said plastic is closed-cell foam, surrounding said balloons, impregnating said mesh, and between said balloons and said skin-means part.

26. A vehicle as set forth in claim 25, in which the material of said upright members comprises resilient metal.

27. A vehicle as set forth in claim 25, in which: said upright members extend orthogonally and transversely into connections with each other, forming upright channels; said connections comprise means strongly attaching said members together; and said balloons are in said upright channels.

28. A vehicle as set forth in claim 25, in which said thin balloon material comprises plastic and said gas is lighter than air.

29. A vehicle as set forth in claim 1, in which said skin means comprises strong mesh and material impregnating and coating said mesh which when applied to the mesh is in plastic condition and which later sets into a firm, solid, skin-surfacing.

30. A vehicle as set forth in claim 1, having a part, attached to said barrel-curved member, which comprises: upright portions of mesh that extend in at least two directions; foamed plastic coating and surrounding said upright portions; an external skin, comprising mesh of strong material; and means strongly fastening said last-named mesh to parts of said first-named mesh.

31. A vehicle as set forth in claim 30, in which said strong mesh material comprises metal.

32. A vehicle as set forth in claim 31, in which said metal is spring steel, and in which said vehicle part further comprises balloons between said upright portion and in said foamed plastic.

33. A vehicle as set forth in claim 1, in which said lift-exerting means comprises: numerous balloons having envelopes containing lighter-than-air gas; and foamed plastic that surrounds said balloons.

34. A vehicle as set forth in claim 33, in which said balloons have thin walls of stretchable plastic and in which said foamed plastic comprises closed gas cells.

35. A device as set forth in claim 1, in which said vehicle is a boat and comprises float means for supporting the vehicle when it is in the water.

36. A boat as set forth in claim 35, in which said float means comprises: upright, tubular, gas-containing elements connected to said barrel-curved member in force-transmitting relation; skin means; and foam plastic within said skin means and over said upright elements.

37. A boat as set forth in claim 36, in which said tubular elements comprise inflated flexible tubes.

38. A boat as set forth in claim 37, in which said tubes are elongated and are of flexible, nonstretchable material.

39. A boat as set forth in claim 37, in which said tubes are of thin spring metal and have flattened, sealed ends.

40. A boat as set forth in claim 38, in which said tubes encompass and are fastened to said barrel-curved structure.

41. A boat as set forth in claim 40, in which said tubes are arranged in sets, each of which encompasses said structure, said sets being juxtaposed in a fore-and-aft direction and decreasing in diameter from fore to aft, and in which said skin means is streamlined.

42. A boat as set forth in claim 36, in which said skin means and tubular elements are constructed and arranged to form fluid-dynamic means which exerts a lifting force on said structure.

43. A vehicle as set forth in claim 1, which further comprises means for supporting it on solid material comprising: resilient tubular elements, connected to said barrel-curved structure in force-transmitting relation; streamlined skin means; flexible foam plastic means; and means connected to said skin means and tubular elements for engaging said solid material and facilitating travel of the vehicle relative to the solid material.

44. A device as set forth in claim 43, in which said tubular elements, skin means and plastic are constructed and arranged to serve as flotation means when the vehicle is in water, and in which said means for engaging solid material comprises wear-resistant means, fixed to said streamlined skin means.

45. A vehicle as set forth in claim 1, in which the said lift-exerting means comprises balloon means, connected to said frame member.

46. A vehicle as set forth in claim 45, in which: said plastic is resilient; said balloon means comprises balloons of flexible-material envelopes; and at least some of said envelopes are inflated with gas at a pressure above that of the atmosphere.

47. A vehicle as set forth in claim 45, in which the said balloon means comprises balloons, containing lighter-than-air gas, within said skin means.

48. A vehicle as set forth in claim 47, in which the said balloons are within said plastic.

49. A vehicle as set forth in claim 1, in which: the said axis of the barrel-curved frame member is transverse to the fore-and-aft axis of the vehicle; the said skin means comprises an after streamlined portion extending aft of said frame member; and the said steering means comprises a support, fixed to said skin means, and a rudder pivotally mounted on said support.

50. A vehicle as set forth in claim 49, in which the said hollow-space-containing frame member comprises a pair of strength-providing end elements, extending transversely to said axis, closing the ends of said hollow space, each of said elements having a hole thru it from said hollow space to the exterior of said member; and in which the said lift-exerting means comprises: a pair of fluid-dynamic fluidfoil means, jutting laterally from said end elements and holes, comprising fluidfoil skin means; and spars, extending within and from end to end of said hollow space, thru said holes and into said fluidfoil skin means.

51. A vehicle as set forth in claim 50, in which the said spars are tubular and have barrel-curved exterior surfaces.

52. A vehicle as set forth in claim 1, in which the said lift-exerting means comprises fluid-dynamic, fluidfoil means, liftingly connected to and supported by said frame member.

53. A vehicle as set forth in claim 1, having internal bracing means which comprises upright portions of metal mesh that are fixed to said barrel-curved frame member and coated with said plastic, in which said plastic contains gas cells; and said skin means comprises mesh and means strongly fastening it to portions of said first-named mesh, in load-sharing relationship.

54. A vehicle as set forth in claim 1, comprising fluidfoil means, connected to said frame member, constructed and arranged to serve as hydrofoil means when the vehicle is traversing water.

55. A vehicle as set forth in claim 54, in which said fluidfoil means comprises tubes and pressurized gaseous material in said tubes.

56. A vehicle as set forth in claim 54, in which said fluidfoil means further comprises pressurized gaseous material inside said tubular elements.

57. A vehicle as set forth in claim 54, in which said gaseous material is gas, at a pressure well above that of the atmosphere.

58. A vehicle, comprising:
a strength-providing, barrel-curved, useful-load-supporting structure, having: strong barrel-curved wall materials that do not yield or break under normal noncollision shocks to the vehicle in its travel, enclosing a load-carrying space, with at least two door and window openings to said space; a longitudinal axis; a portion of largest perimeter in a cross-sectional plane normal to said axis; a blunt, hollow-end portion; an outer curved surface, with which numerous planes normal to said axis form circles that are substantially centered on the axis and successively decrease in diameter from said largest-perimeter portion substantially to said end portion, thus presenting arches against outside shocks from various directions; a hollow interior;
door and window means, comprising door and window elements; and means connecting said door and window elements to other parts of said structure;
shock-taking means, shielding said structure against shocks of collision, comprising: a flexible skin; and means between and connecting said barrel-curved structure and skin, comprising foam plastic; and
means exerting a lift on said barrel-curved structure, comprising balloons, containing lighter-than-air gas, that are surrounded by said foam plastic.

59. A vehicle as set forth in claim 58, in which the lifting force of said lift-exerting means is centered above the center of gravity of the vehicle and comprises balloons in the top part o said load-carrying space and within said foam plastic.

60. A vehicle as set forth in claim 58, in which said lift-exerting means comprises fluidfoil means.

61. A vehicle as set forth in claim 58, which further comprises fluidfoil means for exerting a lift on said barrel-curved member, comprising: barrel-curved wing elements that are connected to said frame member in force-transmitting relation, extend thru it, and project outward from it thru holes in its wall on opposite sides of the vehicle's fore-and-aft axis; fluid-dynamically streamlined skin means; and foam plastic in spaces between said barrel-curved elements and said skin.

62. A vehicle as set forth in claim 58, which comprises vehicle-strengthening mesh, within said skin and attached to said barrel-curved member, said member, mesh and skin being constructed and arranged to form a large wing, having an upper surface, above said load-carrying space, that exerts a fluid-dynamic lift on the structure, and a lower surface that is below said space.

63. A vehicle as set forth in claim 58, in which the center of force of said lift is above the center of gravity of the vehicle, which further comprises: at least one propeller and propeller-driving motor that utilizes energy from an external source, located above said center of gravity; a power plant, located in a lower part of said barrel-curved structure; and means connecting said power plant and motor, for conveying energy from said plant to the motor.

64. A vehicle as set forth in claim 63, in which said motor is hydraulic and said power plant comprises an engine and pumping means.

65. A vehicle as set forth in claim 58, in which said balloons have thin walls of stretchable plastic and in which said foam plastic comprises closed gas cells.